US007752880B2

(12) United States Patent
Sakamoto

(10) Patent No.: US 7,752,880 B2

(45) Date of Patent: Jul. 13, 2010

(54) LINEAR MOTOR MOUNTED PRESS MACHINE AND METHOD FOR CONTROLLING LINEAR MOTOR MOUNTED PRESS MACHINE

(75) Inventor: Hiroichi Sakamoto, Inuyama (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 494 days.

(21) Appl. No.: 11/841,371

(22) Filed: Aug. 20, 2007

(65) Prior Publication Data

US 2008/0041244 A1 Feb. 21, 2008

(30) Foreign Application Priority Data

Aug. 21, 2006 (JP) ............................ 2006-223781

(51) Int. Cl.
*H02K 41/03* (2006.01)
*B30B 1/42* (2006.01)
*B21D 26/00* (2006.01)

(52) U.S. Cl. ............................ 72/430; 72/707; 100/35; 83/630; 29/419.2

(58) Field of Classification Search .................. 72/430, 72/453.02, 453.06, 453.08, 465.1, 466, 466.8, 72/466.9, 707; 100/35, 43, 281; 83/630; 29/705, 863

See application file for complete search history.

(56) References Cited

U.S. PATENT DOCUMENTS

| | | | | |
|---|---|---|---|---|
| 4,809,535 | A * | 3/1989 | Ellis | 72/453.02 |
| 5,095,725 | A * | 3/1992 | Wada et al. | 72/31.13 |
| 5,205,147 | A * | 4/1993 | Wada et al. | 72/429 |
| 5,502,996 | A * | 4/1996 | Strong et al. | 72/430 |
| 6,240,758 | B1 * | 6/2001 | Nagakura | 72/20.1 |
| 7,481,093 | B2 * | 1/2009 | Joseph | 72/430 |
| 7,523,699 | B2 * | 4/2009 | Sakamoto | 100/43 |

FOREIGN PATENT DOCUMENTS

| | | | |
|---|---|---|---|
| JP | 81384 | A | 1/1999 |
| JP | 2001150193 | A | 6/2001 |
| JP | 2001352747 | A | 12/2001 |

* cited by examiner

*Primary Examiner*—David B Jones
(74) *Attorney, Agent, or Firm*—Westerman, Hattori, Daniels & Adrian, LLP

(57) ABSTRACT

The present invention provides a linear motor mounted press machine that generate an optimum thrust for a press tonnage to perform different machining operations including one requiring a greater press tonnage and one requiring a high speed and a smaller press tonnage in an energy efficient manner. A linear motor mounted press machine includes a first linear motor 11, a second linear motor 12 that produces a thrust lower than or equivalent to that of the first linear motor 11, and a coupling switching mechanism 13 that releasably couples output shafts 30, 34 of the first and second linear motor 11, 12 together. A press tool 6 is driven forward and backward by the output shaft 34 of the second linear motor 12. Each of first and second linear motors 11, 12 is a unit linear motor assembly having a plurality of unit linear motors 15 arranged around a press working axis center P. The number of the unit linear motors 15 of the second linear motor 12 is the same as or smaller than that of the first linear motor 11.

10 Claims, 7 Drawing Sheets

LINEAR MOTOR MOUNTED PRESS MACHINE AND METHOD FOR CONTROLLING LINEAR MOTOR MOUNTED PRESS MACHINE

FIELD OF THE INVENTION

The present invention relates to a press machine such as a punch press which use linear motors as a driving source and a method for controlling the linear motor mounted press machine.

BACKGROUND OF THE INVENTION

Press machines such as punch presses commonly use, as a press driving source that moves press tools forward and backward, a mechanism that converts rotary motion of rotary electric motors into rectilinear motion via a crank mechanism, or a hydraulic cylinder. Proposal has also been made of press machines using servo motors as electric motors to vary punch speed during strokes (for example, the Unexamined Japanese Patent Application Publication (Tokkai-Hei 8-1384)). However, press machines using rotary electric motors require a mechanism that converts rotary motion into rectilinear motion and thus have complicated configurations. Further, since rotary motion is converted into rectilinear motion, lost motion or the like may occur, degrading controllability. Press machines using a hydraulic cylinder require a hydraulic supply system such as a hydraulic unit and thus have complicated structures.

Attempts have also been made to use linear motors as a press driving source. Where used to drive punches, linear motors, unlike rotary motors, eliminate the use of a mechanism that converts rotations into rectilinear motion. The linear motor thus reduces the number of parts required and simplifies the structure.

Press working by a punch press or the like generally requires the use of the same machine for different machining operations including one needing a greater press tonnage and one needing only a smaller press tonnage. Where the same linear motor is used to perform these machining operations with markedly different press tonnage, a high-power linear motor is used. However, the high-power linear motor is large and has a heavy movable portion, making it difficult to achieve high-speed operations. Further, even if high-speed operations can be achieved, the high-power linear motor involves increased power consumption, preventing efficient operations. Further, the high-power motor may not be preferable in connection with possible vibration during high-speed machining. Thus, it is not practical to use the high-power linear motor for applications requiring high-speed machining.

Furthermore, linear motors generally use permanent magnets with a strong magnetic force. However, it is difficult to manufacture motors each providing a high thrust owing to the manufacturing limit on the size of magnets, limitations on supply voltage, or the like. Press working may require a linear motor that can produce a thrust higher than that required for general machining. Thus, a required press tonnage may not be provided by a single linear motor. Thus, only some of a plurality of coupled linear motors may be driven for machining with a small press tonnage. However, in this case, the coupled linear motors in a non-driving state may act as resistance to reduce the efficiency of use of electric energy.

It is an object of the present invention to provide a linear motor mounted press machine which has a press driving source of a simple configuration comprising linear motors and which can generate an optimum thrust for a press tonnage to perform different machining operations including one requiring a greater press tonnage and one requiring a high speed and a smaller press tonnage in an energy efficient manner.

It is another object of the present invention to use a plurality of linear motors to increase power, while providing balanced rectilinear-propagation outputs and to allow a thrust of a small press tonnage to be efficiently produced when machining is performed using only a second linear motor.

It is yet another object of the present invention to spatially efficiently arrange the linear motors to obtain a further compact configuration.

It is still another object of the present invention to allow each of the linear motors to be made compact and efficient and to enable the unit linear motors to be combined into a simple configuration.

It is further another object of the present invention to appropriately drive both linear motors to efficiently perform a machining operation requiring a greater press tonnage and a machining operation requiring a high speed and a smaller press tonnage.

It is further another object of the present invention to allow energy-efficient machining corresponding to the press tonnage to be performed by simple control.

A linear motor mounted press machine in accordance with the present invention comprises a first linear motor, a second linear motor that produces a thrust lower than or equivalent to that of the first linear motor, a coupling switching mechanism that releasably couples output shafts of the first linear motor and the second linear motor together, and a press tool that is driven forward and backward by the output shaft of the second linear motor.

This configuration moves the press tool forward and backward using the linear motors, eliminating the need for a mechanism that converts rotation into rectilinear motion, as opposed to configurations using rotary motors. This provides a simple structure with a reduced number of parts. The press machine also comprises the first linear motor and the second linear motor, and the coupling switching mechanism coupling these linear motors together. Thus, for machining requiring a greater press tonnage, both linear motors are coupled together and driven, or the first linear motor, which produces higher power, is driven to enable machining corresponding to the required greater press tonnage. For machining requiring only a smaller press tonnage, the coupling switching mechanism is brought into a decoupling state to allow only the second linear motor, which produces lower power, to be used for driving. This enables high-speed machining with reduced vibration. In this case, the first linear motor is disconnected from the second linear motor and thus does not resist the driving of the second linear motor. This enables efficient operations.

In the present invention, each of the first and second linear motors may be a unit linear motor assembly having a plurality of unit linear motors arranged around a press working axis center along which the press tool elevates and lowers, and the second linear motor may have fewer unit linear motors than the first linear motor. When each of the first and second linear motors is the unit linear motor assembly, the power of the individual unit linear motors can be collectively used to obtain high power. Further, the plurality of unit linear motors are arranged around the press working axis center. Consequently, balanced rectilinear-propagation outputs can be obtained in spite of the installation of the plurality of unit linear motors. The second linear motor has the fewer unit linear motors than the first linear motor. This reduces the mass of the operative portion. When only the second linear motor is used for machining, a thrust of a smaller press tonnage can be efficiently produced.

When each of the first and second linear motors is the unit linear motor assembly, the second unit linear motors may be arranged inside an arrangement of the unit linear motors of the first linear motor. Thus, the arrangements of the unit linear motors of the first and second linear motors are concentric and form a double arrangement, making it possible to make the entire arrangement compact. In this case, the second linear motor for a smaller press tonnage is located inside. This enables a spatially efficient arrangement corresponding to the size of each of the linear motors. Therefore, an efficient, more compact arrangement can be achieved.

In the present invention, the unit linear motor may be a cylindrical linear motor having a shaft member comprising a permanent magnet having N poles and S poles alternately arranged in an axial direction and a coil unit through which the shaft member is movable relative to the coil unit. In the cylindrical linear motor, the coil unit is positioned around the periphery of the magnet member, allowing magnetic fields to be efficiently utilized. This linear motor is thus compact and efficient.

In the present invention, the press machine may further comprise a coupling state and motor-to-be-used selection control means for performing control such that when a required press tonnage is smaller than a set press tonnage, the coupling switching mechanism is brought into a decoupling state to allow only the linear motor to be driven, and when the required press tonnage is at least the set press tonnage, the coupling switching mechanism is brought into a coupling state so that the first press driving source cooperates with the second press driving source in performing a driving operation. Where the coupling state and motor-to-be-used selection control means is provided to control the coupling and driving of both linear motors in accordance with the required press tonnage, both linear motors can be appropriately driven to efficiently perform a machining operation requiring a greater press tonnage and a machining operation requiring a high speed and a smaller press tonnage.

In the present invention, where the first or second linear motor comprises a plurality of unit linear motors, the press machine may further comprise a unit linear motor selection control means for selectively driving some of the plurality of unit linear motors of one of the first and second linear motors. Driving only some of the unit linear motors allows machining to be performed in accordance with the press tonnage in an energy efficient manner.

The linear motor mounted press machine in accordance with the present invention comprises the first linear motor, the second linear motor that produces a thrust lower than or equivalent to that of the first linear motor, the coupling switching mechanism that releasably couples the output shafts of the first and second linear motor together, and the press tool that is driven forward and backward by the output shaft of the second linear motor. Thus, the press driving source has a simple configuration comprising the linear motors. Further, the optimum thrust for the press tonnage is generated to enable different machining operations including one requiring a greater press tonnage and one requiring a high speed and a smaller press tonnage in an energy efficient manner.

Each of the first and second linear motors is the unit linear motor assembly having the plurality of unit linear motors arranged around the press working axis center along which the press tool elevates and lowers. Further, the plurality of unit linear motors provide balanced rectilinear-propagation outputs. Where only the second linear motor is used for machining, a thrust of a smaller press tonnage can be efficiently produced.

When each of the first and second linear motors is the unit linear motor assembly, where the second unit linear motors are arranged inside the arrangement of the unit linear motors of the first linear motor, then the linear motors can be more spatially efficiently arranged, resulting in a more impact configuration.

When the unit linear motor is the cylindrical linear motor having the shaft member comprising the permanent magnet having N poles and S poles alternately arranged in the axial direction and the coil unit through which the shaft member is movable relative to the coil unit, each unit linear motor may be compact and efficient. Further, the plurality of unit linear motors can be combined into a simple configuration.

In the present invention, where the press machine further comprises the coupling state and motor-to-be-used selection control means for performing control such that where the required press tonnage is smaller than the set press tonnage, the coupling switching mechanism is brought into the decoupling state to allow only the second linear motor to be driven, and when the required press tonnage is at least the set press tonnage, the coupling switching mechanism is brought into the coupling state so that the first linear motor cooperates with the second linear motor in performing a driving operation, both linear motors can be appropriately driven to efficiently perform a machining operation requiring a greater press tonnage and a machining operation requiring a high speed and a smaller press tonnage.

In the present invention, where the press machine further comprises the unit linear motor selection control means for selectively driving some of the plurality of unit linear motors of one of the first and second linear motors, energy-efficient machining corresponding to the press tonnage can be performed by simple control.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
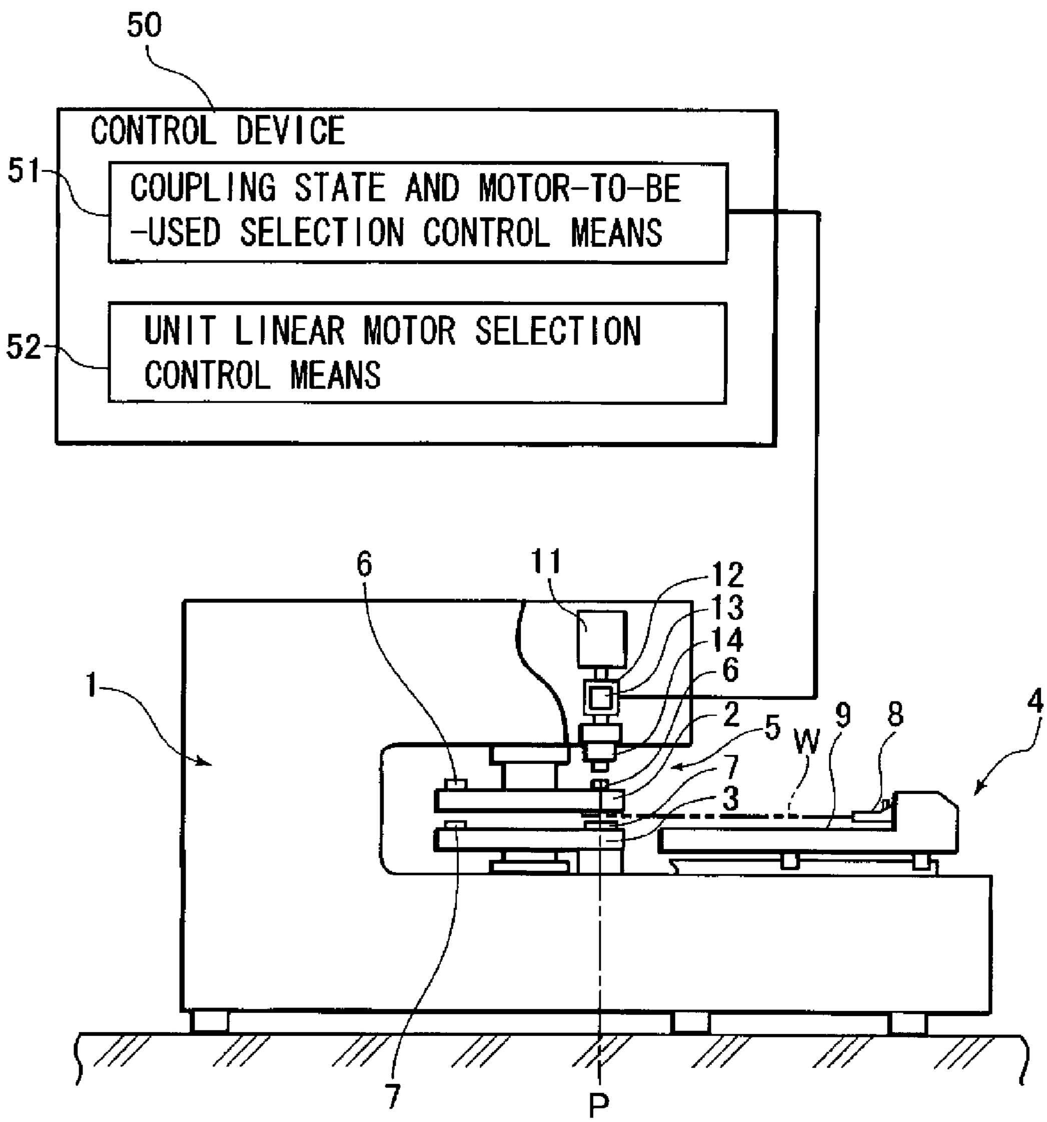
FIG. 1 is an explanatory drawing showing a combination of a side view of a linear motor mounted press machine in accordance with a first embodiment of the present invention and a block diagram of a control system for the linear motor mounted press machine.

A first embodiment of the present invention will be described with reference to FIGS. 1 to 5. The linear motor mounted press machine is called, for example, a punch press, and has a press frame 1, and a vertical pair of tool supports 2, 3, a workpiece feeding mechanism 4, and a press driving mechanism 5 which are installed on the press frame 1.

The tool supports 2, 3 comprise an upper turret and a lower turret, respectively, which are concentrically installed and have punch press tools 6 and die press tools 7, respectively, mounted at a plurality of positions in a circumferential direction. Rotation of the tool supports 2, 3 indexes each of the press tools 6, 7 to a predetermined press working axis center P.

The workpiece feeding mechanism 4 has a workpiece holder 8 that grips an edge of a workpiece W that is a plate material to move the workpiece W forward, backward, rightward, and leftward on a table 9.

The press driving mechanism 5 comprises a first linear motor 11 and a second linear motor 12 installed immediately below the first linear motor 11, as a press driving source. Output shafts of the first linear motor 11 and the second linear motor 12 are releasably coupled together by a coupling switching mechanism 13. A ram 14 is coupled to the output shaft of the second linear motor 12 to allow the punch press tool 6 to be lowered for a press working. The press tool 6 may be elevated and returned by a spring member (not shown in the drawings) or may be forcibly lifted by the ram 14.

Figure 2:
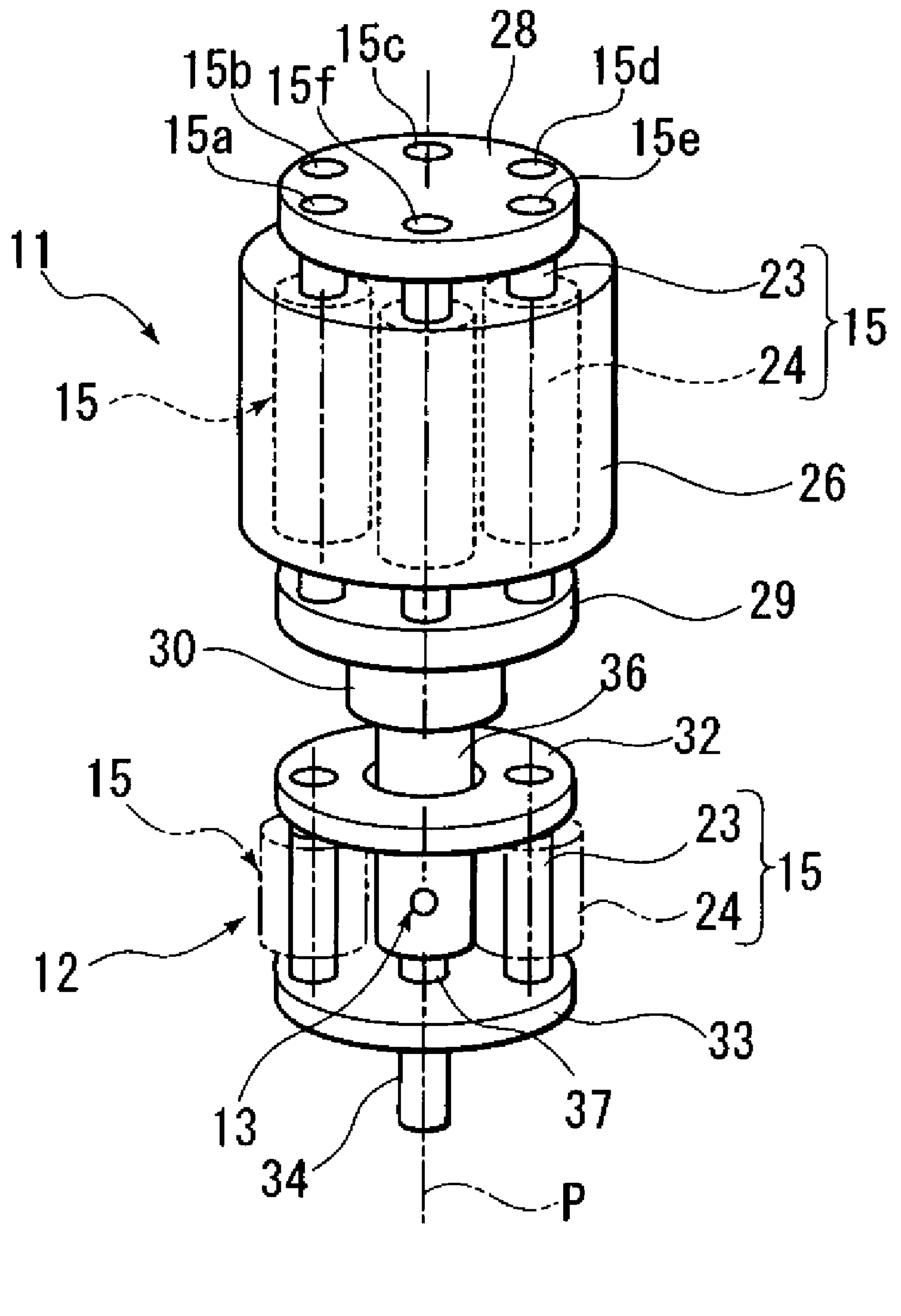
FIG. 2 is a schematic perspective view showing the relationship between a first linear motor and a second linear motor of the linear motor mounted press machine.
Figure 3:
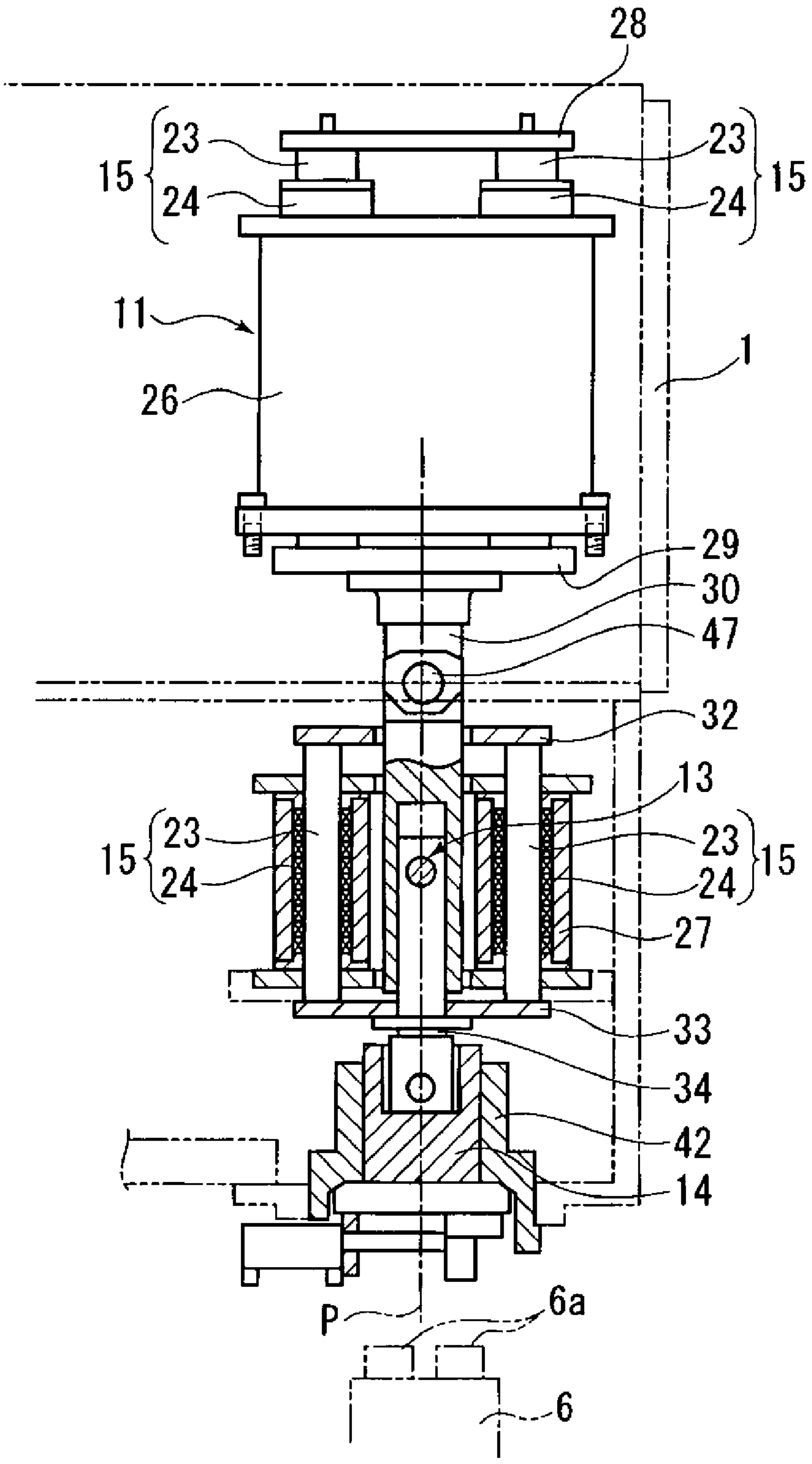
FIG. 3 is an enlarged exploded side view showing a part of the linear motor mounted press machine in which the first and second linear motors are installed.

As shown in FIG. 2 and FIG. 3, the first linear motor 11 is a unit linear motor assembly having a plurality of unit linear motors 15 arranged on a circumference around a press working axis center P. The plurality of unit linear motors 15 are arranged at equal intervals and at equal angles. In the illustrated example, six unit linear motors 15 (**15*a* to 15*f*) constitute one linear motor 11**.

Figure 5:
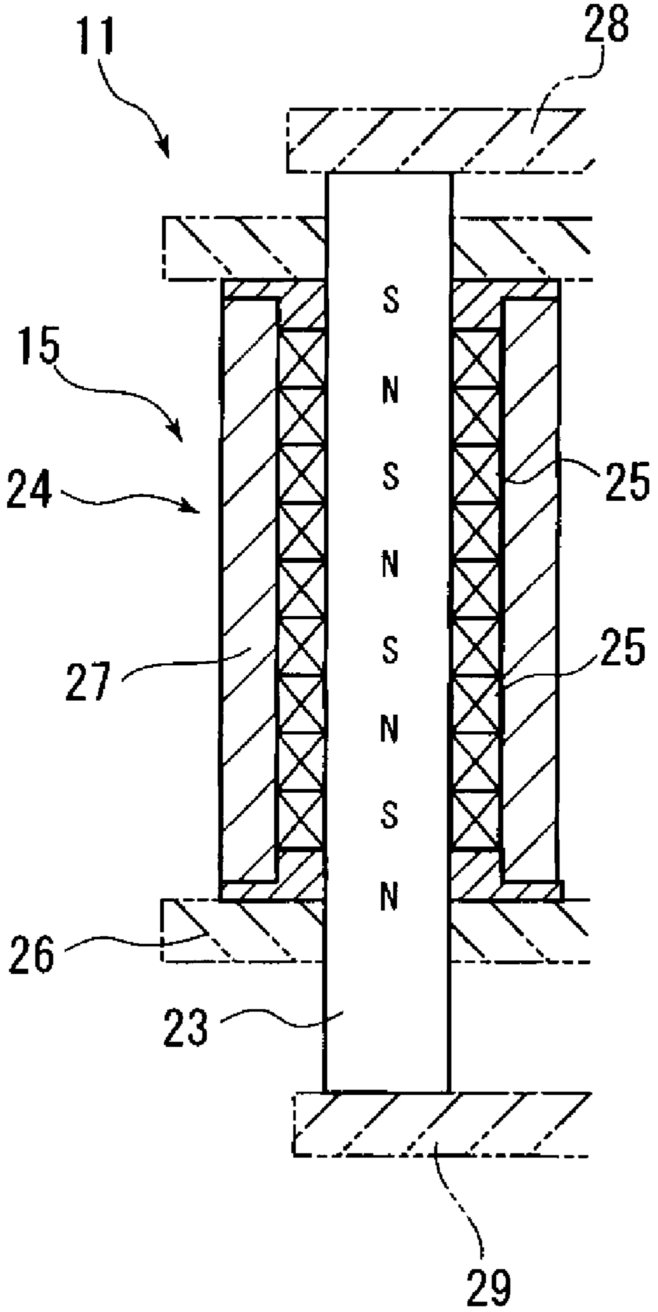
FIG. 5 is an enlarged sectional view showing a unit linear motor of the first linear motor.

As shown in FIG. 5, each of the unit linear motors 15 is a cylindrical linear motor comprising a shaft member 23 composed of a permanent magnet having alternatively arranged N and S poles, and a coil unit 24 through which the shaft member 23 is movable in an axial direction relative to the coil unit 24. The coil unit 24 comprises a plurality of coils 25 surrounding the periphery of the shaft member 23 and arranged in a cylindrical unit linear motor case 27 in the axial direction. The coil unit 24 serves as a stator, and the shaft member 23 serves as an output shaft that moves the unit linear motor 15. The shaft member 23 comprises one round-bar-like member but may comprise a plurality of permanent magnets arranged in the axial direction.

The unit linear motor case 27 is fixed to a general motor frame 26 so that the coil unit 24 of each unit linear motor 15 constitutes a motor stator for the first linear motor 11. The coils 25 of the coil units 24 of the individual unit linear motors 15 may be installed in one common general motor frame 26 without providing the individual unit linear motor cases 27.

One ends of the shaft member 23 of the unit linear motors 15 are coupled together by an upper output shaft coupling frame 28, and other ends of the shaft member 23 of the unit linear motors 15 are coupled together by a lower output shaft coupling frame 29. An output shaft 30 (FIGS. 3, 4) of the linear motor 11 is provided in the center of the lower output shaft coupling frame 29.

Like the first linear motor 11, the second linear motor 12 comprises a unit linear motor assembly of a plurality of unit linear motors 15 arranged around the press working axis center P. The number of unit linear motors 15 in the second linear motor 12 is set equal to or greater than that in the first linear motor 11 and is two in the illustrated example. The configuration of the unit linear motor 15 of the second linear motor 12 is the same as that of the unit linear motor 15 of the first linear motor 11, described above with reference to FIG. 5, except that the former has lower power and a smaller size than the latter. Thus, corresponding components are denoted by the same reference numerals and their description is omitted. The unit linear motors 15 of the first linear motor 11 and the second linear motor 12 may be specified to have the same size and power.

The unit linear motor case 27 is fixed to a general motor frame 31 so that the coil unit 24 of each unit linear motor 15 of the second linear motor 12 constitutes a motor stator for the linear motor 12. One ends of the shaft member 23 of the unit linear motors 15 are coupled together by an upper output shaft coupling frame 32, and other ends of the shaft member 23 of the unit linear motors 15 are coupled together by a lower output shaft coupling frame 33. An output shaft 34 of the linear motor 12 is provided in the center of the lower output shaft coupling frame 33.

Figure 4:
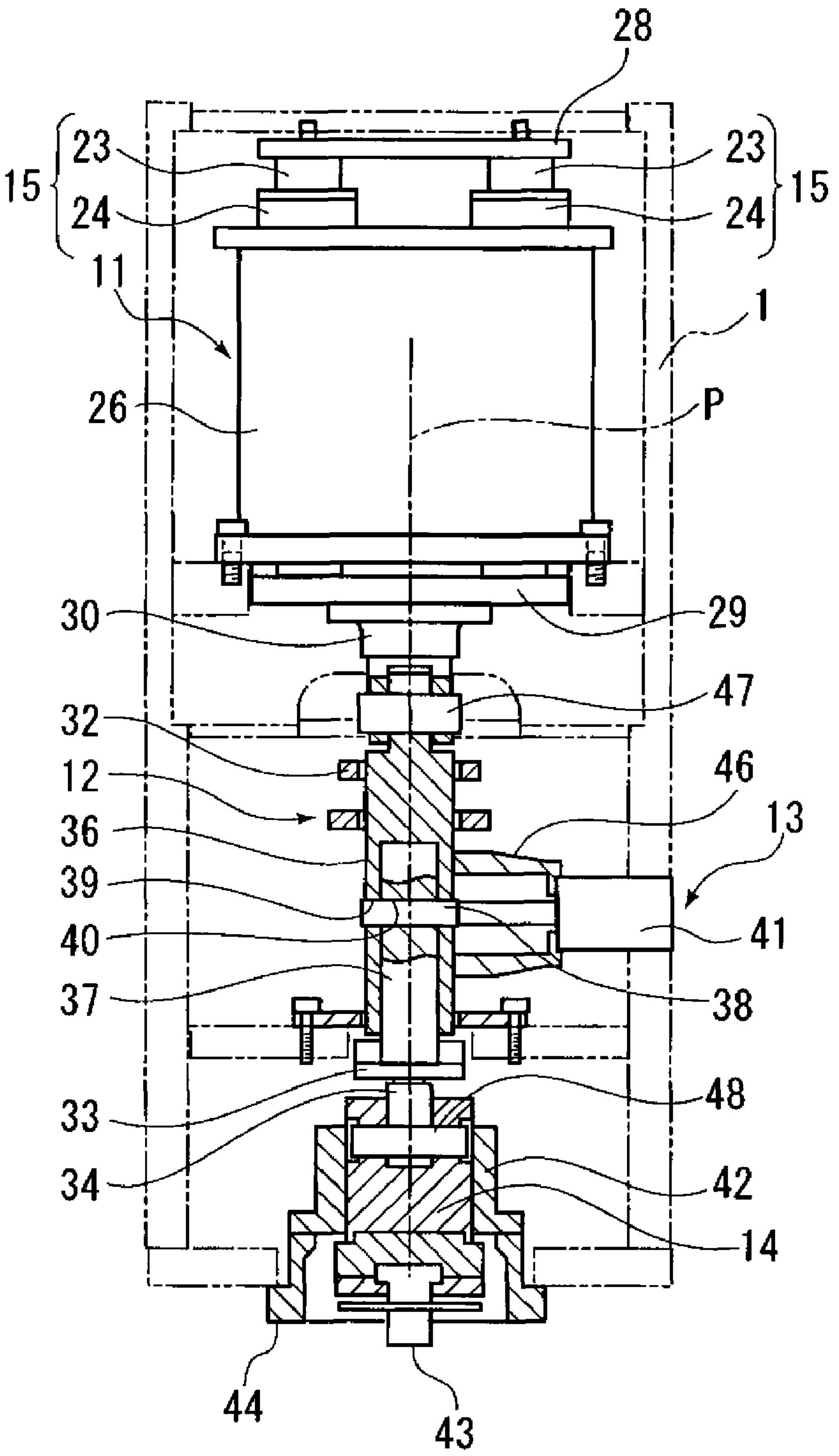
FIG. 4 is an enlarged exploded front view showing the part of the linear motor mounted press machine in which the first and second linear motors are installed.

As shown in FIG. 3 and FIG. 4, a coupling shaft 36 having a hollow shaft portion at its bottom is connected to the output shaft 30 of the first linear motor 11 so as to extend downward from the output shaft 30. A coupled shaft 37 is slidably fitted in the hollow shaft portion of the coupling shaft 36 so as to extend upward from the output shaft 34 of the second linear motor 12.

As shown in FIG. 4, combining holes 39, 40 are formed in fitting portions of the coupling shaft 36 and the coupled shaft 37 so that a combining shaft 38 can be fitted both into the coupling shaft 36 and into the coupled shaft 37. The combining shaft 38 is inserted into and removed from a combining hole 40 in the coupled shaft 37 on the linear motor 12 side by an insertion and removal driving source 41 installed on the output portion shaft 20 via a mounting member 46. The insertion and removal driving source 41, the combining shaft 38, the combining holes 39, 40, and the coupled shaft 37 constitute the coupling switching mechanism 13. The insertion and removal driving source 41 comprises an electromagnetic solenoid, a cylinder device, or the like. The coupling shaft 36 on the first linear motor 11 side is swingably coupled to the output shaft 30 by a pin 47. The coupling shaft 36 swings freely to allow a lateral external force acting on the fitting portions of the coupling shaft 36 and coupled shaft 37 to escape, maintaining smooth sliding.

As shown in FIG. 3, the output shaft 34 of the second linear motor 12 is swingably coupled to a ram 14 by a pin 48. The ram 14 is fitted in a ram guide 42 installed in the press frame 1 so as to be able to elevate and lower. A striker 43 is provided under the ram 14 so as to be movable in a direction orthogonal to the press working axis center P. A shift driving source 44 can vary the position of the striker 43 relative to the center of the ram 14. The striker 43 drivingly pushes up the punch press tool 6.

Where the press tool 6 has a plurality of individual tools **6*a* as shown in FIG. 3, the striker 43 allows the individual tools 6*a* to be selectively driven. Where the press tool 6 has no individual tools 6*a*, the striker 43 is not provided and the ram 14 directly drives the press tool 6**.

With reference to FIG. 1, a control system will be described. A control device 50 controls the whole linear motor mounted press machine and comprises a computerized numerical control device and a programmable controller. The control device 50 executes a machining program (not shown in the drawings) via an arithmetic control section (not shown in the drawings) to control the linear motor mounted press machine. The control device 50 outputs control instructions to an index driving source (not shown in the drawings) for the tool supports 2, 3, a feed driving source for the shafts of the work feeding device 4, the first linear motor 11 and the second linear motor 12 of the press driving mechanism 5, the coupling switching mechanism 13, and the like. The control device 50 has coupling a state and motor-to-be-used selection control means 51 and a unit linear motor selection control means 52.

When a required press tonnage is smaller than a set press tonnage, the coupling state and motor-to-be-used selection control means 51 controllably brings the coupling switching mechanism 13 into a decoupling state to allow only the second linear motor 12 to be driven. When the required press tonnage is at least the set press tonnage, the coupling state and motor-to-be-used selection control means 51 controllably brings the coupling switching mechanism 13 into a coupling state to allow both the first linear motor 11 and the second linear motor 12 to be driven. In this case, for example, the first linear motor 11 is driven in synchronism with the second linear motor 12. The coupling state and motor-to-be-used selection control means 51 recognizes the required press tonnage on the basis of, for example, a value described in the machining program or obtains it by performing a predetermined arithmetic operation on a press tool to be used which is specified by the machining program.

The unit linear motor selection control means 52 controllably and selectively drives some of the plurality of unit linear motors 15 of one of the first linear motor 11 and the second linear motor 12. More specifically, the unit linear motor selection control means 52 controllably drives, for example, only three or two of the unit linear motors 15 of the first linear motor 11 which are arranged at equally distributed positions.

The operation of the above configuration will be described. For machining with a greater press tonnage, the coupling switching mechanism 13 is brought into a coupling state in which the combining shaft 38 is fitted into both combining holes 39, 40 to drive both the first linear motor 11 and the second linear motor 12. Thus, a high thrust produced by driving both the first linear motor 11 and the second linear motor 12 can be used to elevate and lower the ram 14 for press working. The press working may be performed by driving only the first linear motor 11 without applying any driving current to the second linear motor 12. The first linear motor 11 provides higher power than the second linear motor 12, enabling machining with a greater press tonnage.

For machining with a smaller press tonnage, the coupling switching mechanism 13 is brought into a decoupling state by removing the combining shaft 38 from the combining hole 40 to allow only the second linear motor 12 to be driven. This allows the press working to be performed only by the second linear motor 12, which provides lower power, and allows the ram 14 to elevate and lower at a high speed for the press working. In this case, the output shaft 30 of the first linear motor 11 is disconnected from the second linear motor 12. Accordingly, the movable portion of the first linear motor 11 does not contribute to offering resistance or inertia to the driving of the second linear motor 11. This enables efficient machining.

Alternatively, for machining with a smaller press tonnage, it is possible to drive only some of the unit linear motors 15 of the second linear motor 12. Where the second linear motor 12 has two unit linear motors 15 as shown in the illustrated example, both unit linear motors need to be driven. However, where the second linear motor 12 has at least four unit linear motors 15, energy consumption can be saved by selectively driving the unit linear motors 15. Also for the driving of the first linear motor 11, the press working may be preformed by driving only some of the unit linear motors 15.

The coupling state and decoupling state of the coupling switching mechanism 13 may be selectively switched for each machining operation for one workpiece W or for each lot, or during machining of each workpiece W.

The linear motor mounted press machine configured as described above uses the linear motors 11, 12 to move the press tool 6 forward and backward. Thus, the linear motor mounted press machine does not require any mechanism for converting rotations into rectilinear motion, as opposed to press machines using rotary motors. This provides a simplified structure with a reduced number of parts. Further, the linear motor mounted press machine has the first linear motor 11 and the second linear motor 12, and the coupling switching mechanism 13 that releasably couples these linear motors together. This enables the optimum thrust for the press tonnage to be generated, allowing the single linear motor mounted press machine to efficiently perform different machining operations including one requiring a greater press tonnage and one requiring a high speed and a smaller press tonnage.

Each of the first linear motor 11 and the second linear motor 12 is an assembly of the unit linear motors 15. This allows the power of the individual unit linear motors 15 to be collectively utilized to obtain high power. Further, the plurality of unit linear motors 15 are installed around the press working axis center P. This provides balanced rectilinear-propagation outputs even with the installation of the plurality of unit linear motors 15. The number of the unit linear motors 15 of the second linear motor 12 is smaller than that of the first linear motor 11. Consequently, machining only with the second linear motor 12 allows a thrust of a small press tonnage to be efficiently produced.

When the coupling state and motor-to-be-used selection control means 51 is provided to controllably couple and drive the linear motors 11, 12 in accordance with the required press tonnage, the linear motors 11, 12 can be appropriately driven to efficiently perform a machining operation requiring a greater press tonnage and a machining operation requiring a high speed and a smaller press tonnage. When the unit linear motor selection control means 52 is provided to selectively drive some of the unit linear motors 15 of one of the first linear motor 11 and the second linear motor 12, energy-efficient machining corresponding to the press tonnage can be performed driving only some of the unit linear motors 15.

Figure 6:
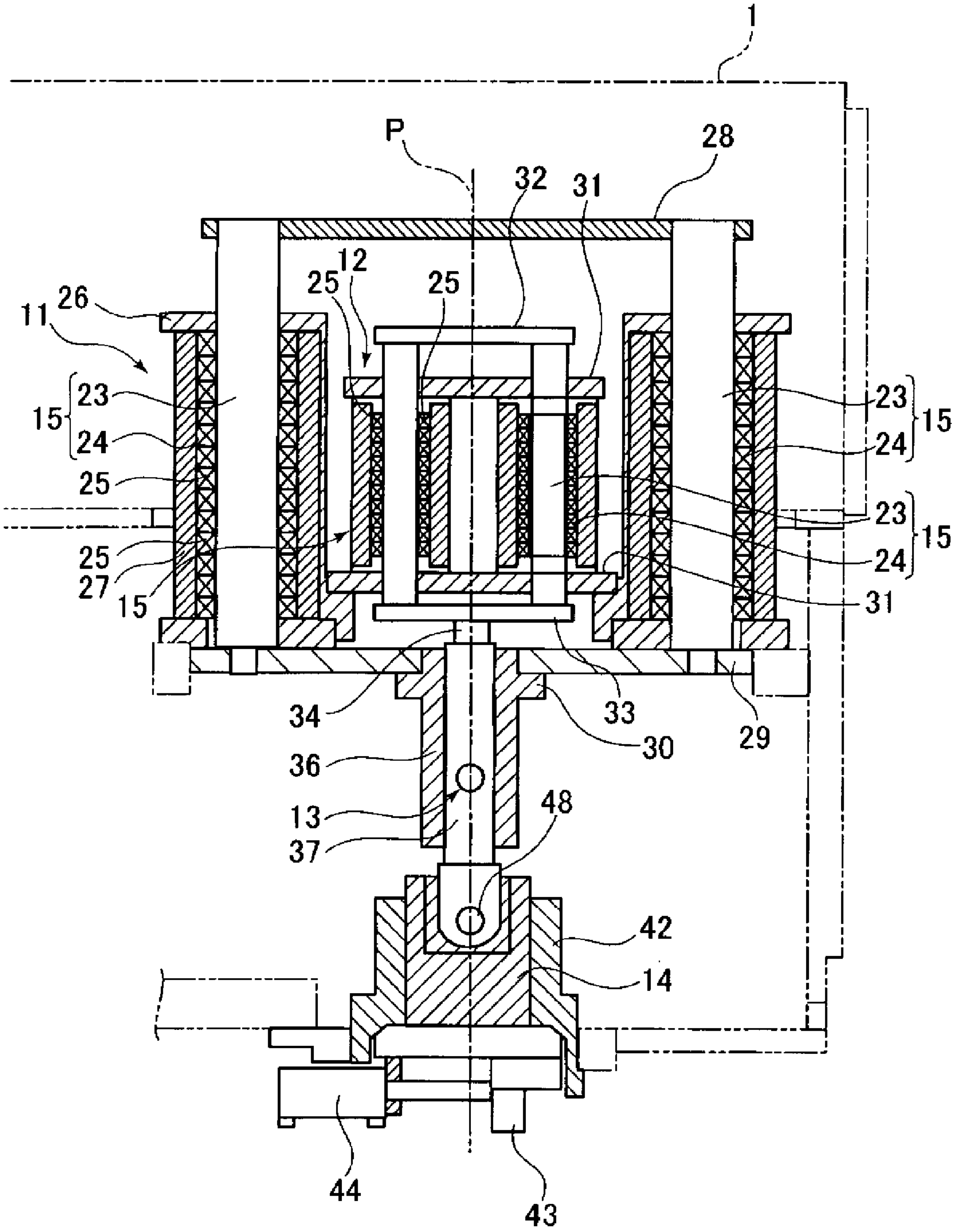
FIG. 6 is an enlarged exploded side view showing that part of a linear motor mounted press machine in accordance with another embodiment of the present invention in which the first and second linear motors are installed.
Figure 7:
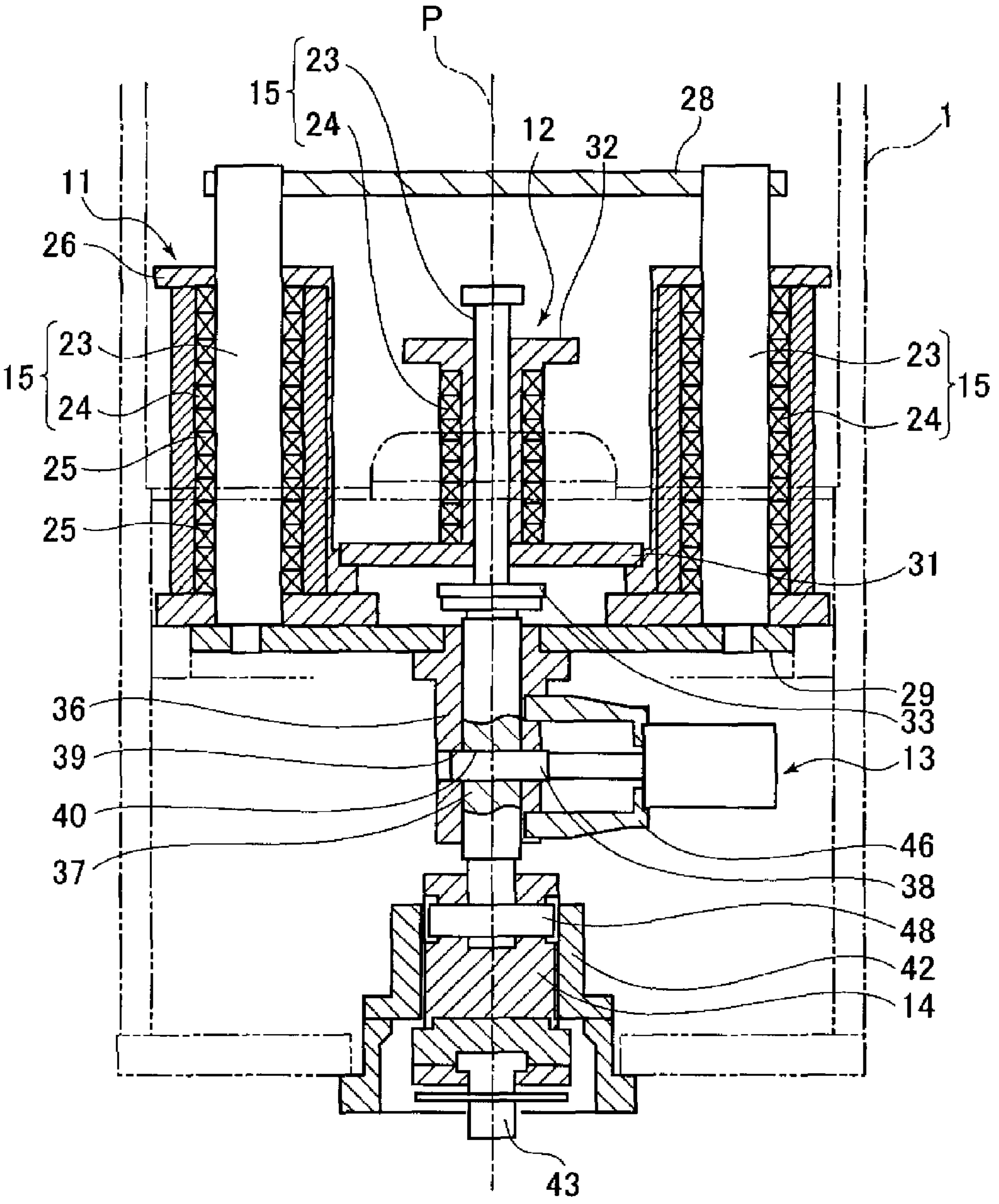
FIG. 7 is an enlarged exploded front view showing the part of the linear motor mounted press machine in FIG. 6 in which the first and second linear motors are installed.

FIG. 6 and FIG. 7 show another embodiment of the present invention. In this embodiment, the unit linear motors 15 of the second linear motor 12 are arranged inside the arrangement of the unit linear motors 15 of the first linear motor 11. The remaining part of the configuration of this embodiment is similar to that of the first embodiment, shown in FIGS. 1 to 5. Thus, corresponding components are denoted by the same reference numerals and duplicate descriptions are omitted.

When the arrangements of the unit linear motors 15 of the first linear motor 11 and the second linear motor 12 are thus concentric and form a double arrangement, the entire arrangement can be made more compact. In this case, the second linear motor 12 for a smaller press tonnage is located inside. This enables a spatially efficient arrangement corresponding to the size of each of the linear motors 11, 12. Therefore, an efficient, more compact arrangement can be achieved.

In the above description, the embodiments are applied to a punch press. However, the present invention is applicable to general press machines, for example, press brakes.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

The invention claimed is:

1. A linear motor mounted press machine comprising:

a first linear motor;

a second linear motor that produces a thrust lower than or equivalent to that of the first linear motor;

a coupling switching mechanism that releasably couples output shafts of the first and second linear motor together; and a press tool driven forward and backward by the output shaft of the second linear motor, wherein each of said first and second linear motors is a unit linear motor assembly having a plurality of unit linear motors arranged around a press working axis center along which the press tool elevates and lowers, and the second linear motor has fewer unit linear motors than the first linear motor.

2. A linear motor mounted press machine according to claim 1, wherein each of said first and second linear motors is a cylindrical linear motor having a shaft member comprising a permanent magnet having N poles and S poles alternately arranged in an axial direction and a coil unit through which the shaft member is movable relative to the coil unit.

3. A linear motor mounted press machine according to claim 1, characterized by further comprising a coupling state and motor-to-be-used selection control means for performing control such that when a required press tonnage is smaller than a set press tonnage, said coupling switching mechanism is brought into a decoupling state to allow only the second linear motor to be driven, and where the required press tonnage is at least the set press tonnage, said coupling switching mechanism is brought into a coupling state so that the first linear motor cooperates with the second linear motor in performing a driving operation.

4. A linear motor mounted press machine according to claim 1, further comprising:

a unit linear motor selection control means for selectively driving some of the plurality of a unit linear motors of one of the first and second linear motors.

5. A linear motor mounted press machine comprising:

a first linear motor;

a second linear motor that produces a thrust lower than or equivalent to that of the first linear motor;

a coupling switching mechanism that releasably couples output shafts of the first and second linear motor together; and a press tool that is driven forward and backward by the output shaft of the second linear motor, wherein each of said first and second linear motors is a unit linear motor assembly having a plurality of unit linear motors arranged around a press working axis center along which the press tool elevates and lowers, and the second unit linear motors are arranged inside an arrangement of the unit linear motors of the first linear motor.

6. A linear motor mounted press machine according to claim 5, characterized in that the unit linear motor is a cylindrical linear motor having a shaft member comprising a permanent magnet having N poles and S poles alternately arranged in an axial direction and a coil unit through which the shaft member is movable relative to the coil unit.

7. A linear motor mounted press machine according to claim 5, further comprising a coupling state and motor-to-be-used selection control means for performing control such that when a required press tonnage is smaller than a set press tonnage, said coupling switching mechanism is brought into a decoupling state to allow only the second linear motor to be driven, and where the required press tonnage is at least the set press tonnage, said coupling switching mechanism is brought into a coupling state so that the first linear motor cooperates with the second linear motor in performing a driving operation.

8. A linear motor mounted press machine according to claim 5 further comprising:

a unit linear motor selection control means for selectively driving some of the plurality of a unit linear motors of one of the first and second linear motors.

9. A method for controlling a linear motor mounted press machine comprising a first linear motor, a second linear motor that produces a thrust lower than or equivalent to that of the first linear motor, a coupling switching mechanism that releasably couples output shafts of the first and second linear motor together, and a press tool that is driven forward and backward by the output shaft of the second linear motor, the method comprising:

decoupling said output shafts to allow only said second linear motor to be driven where a required press tonnage is smaller than a set press tonnage, and coupling said output shafts to allow said first linear motor to cooperate with said second linear motor in performing a driving operation where the required press tonnage is at least the set press tonnage, wherein each of said first and second linear motors is a unit linear motor assembly having a plurality of unit linear motors arranged around a press working axis center along which the press tool elevates and lowers, and the second linear motor has fewer unit linear motors than the first linear motor.

10. A method for controlling a linear motor mounted press machine comprising a first linear motor, a second linear motor that produces a thrust lower than or equivalent to that of the first linear motor, a coupling switching mechanism that releasably couples output shafts of the first and second linear motor together, and a press tool that is driven forward and backward by the output shaft of the second linear motor, the method comprising:

decoupling said output shafts to allow only said second linear motor to be driven where a required press tonnage is smaller than a set press tonnage, and coupling said output shafts to allow said first linear motor to cooperate with said second linear motor in performing a driving operation where the required press tonnage is at least the set press tonnage, wherein each of said first and second linear motors is a unit linear motor assembly having a plurality of unit linear motors arranged around a press working axis center along which the press tool elevates and lowers, and the second unit linear motors are arranged inside an arrangement of the unit linear motors of the first linear motor.

* * * * *